United States Patent [19]

Münchow et al.

[11] 4,281,376
[45] Jul. 28, 1981

[54] PROTECTED CONVERTER ARRANGEMENT

[75] Inventors: Eberhard Münchow, Nuremberg; Paul Mourick, Hausen; Jürgen Strop, Langensendelbach, all of Fed. Rep. of Germany

[73] Assignee: Siemens Aktiengesellschaft, Berlin and Munich, Fed. Rep. of Germany

[21] Appl. No.: 40,462

[22] Filed: May 18, 1979

[30] Foreign Application Priority Data

Jun. 22, 1978 [DE] Fed. Rep. of Germany ....... 2827443

[51] Int. Cl.³ .............................................. H02J 9/06
[52] U.S. Cl. ...................................... 363/50; 363/79; 307/87; 307/219
[58] Field of Search ............................ 363/50, 55–58, 363/68–69, 79, 81, 95–96; 307/44, 64–65, 85–87, 219, 204

[56] References Cited

U.S. PATENT DOCUMENTS

| | | | |
|---|---|---|---|
| 3,612,894 | 10/1971 | Schmidt | 307/64 |
| 3,723,847 | 3/1973 | Chaupit | 363/68 |
| 3,729,670 | 4/1973 | Dewey | 363/51 |
| 4,020,360 | 4/1977 | Udvardi-Lakos | 363/79 |
| 4,096,394 | 6/1978 | Ullmann et al. | 307/64 |

*Primary Examiner*—William M. Shoop
*Assistant Examiner*—Peter S. Wong
*Attorney, Agent, or Firm*—Kenyon & Kenyon

[57] ABSTRACT

A protected converter arrangement having electronic power circuitry using controlled valves and electronic information-processing control circuitry. The electronic power circuitry is provided only once, but the electronic information-processing circuitry is redundant and contains at least two complete control units. One unit leads and controls the electronic power circuit and at least one other unit operates in parallel, in standby condition. A monitoring device is associated with the control units and, in the event of a disturbance in the leading control unit, switches control of the electronic power circuit to an undisturbed control unit. The arrangement is especially suitable for use in protected converter arrangements which provide interruption-free supply of a load, having the advantage that the expensive electronic power circuitry is provided only once and is not operated in partial-load operation.

3 Claims, 11 Drawing Figures

PROTECTED CONVERTER ARRANGEMENT

BACKGROUND OF THE INVENTION

1. Field of the Invention

This invention relates to a protected converter arrangement, consisting of electronic power circuitry with controlled valves and information-processing electronic circuitry for controlling the valves.

2. Discussion of the Prior Art

Converter arrangements using controlled valves, for instance, rectifiers, DC (chopper) controllers, inverters, AC controllers and semiconductor switches are usually equipped with thyristors or transistors. The use of such semiconductor components of the power type ensures high operating reliability in such converters. The high operating reliability of thyristor inverters has led to increasing employment of static converters in protected power supply installations instead of the rotating converters customary up to now. For consumers having still more stringent requirements, power supplies for completely interruption-free service in which several static converters operate in parallel are being built. Several such plant concepts are described in the journal "Energie und Technik", 1971, pages 61 to 64.

When several inverters having a central control unit are operated in parallel, the inverters which are connected in parallel on the output side are controlled by a common control unit. This technique provides only little security against a total failure.

In parallel operation with a central synchronizing oscillator, several complete inverters are synchronized by a central oscillator. The assurance against total failure is already very high here, since only the failure of the central oscillator can lead to total failure.

Even higher reliability against total failure is offered by redundant partial-load operation, there being no central equipment in which a disturbance can result in a total failure. With this technique, several completely independent inverters influence each other to a limited degree. They operate normally with partial load. In the event of a disturbance, the disturbed equipment is discovered by monitoring devices and is disconnected. The entire consumer load is taken over by the equipments which continue to operate.

In known converter arrangements having several converters operating in parallel, the high investment costs are a disadvantage. In addition, high losses are incurred continuously, as in undisturbed operation, the individual converters operate only in the partial load range.

It is an object of the invention to provide a protected converter arrangement for supplying uninterrupted power to a consumer which is distinguished by low investment costs and low operating costs.

SUMMARY OF THE INVENTION

According to the invention, this problem is solved by the following characteristic features:

(a) Only one electronic power circuit is provided;

(b) the electronic information circuit is redundant and contains at least two complete control units of which one control unit always controls the electronic power circuit as the leading control, and the other parallel control unit operates in standby operation; and (c) a monitoring device is associated with the control units which, in the event of a disturbance in the leading control, switches the control function for the electronic power circuit to an undisturbed control unit.

A converter arrangement, according to the teachings of the invention, is based on the insight that the electronic information circuitry for controlling a converter has a number of components and connections, which is an order of magnitude larger than that of the electronic power circuitry of the converter. From the point of view of reliability, the probability of a defect in the electronic power circuitry is negligible as against the probability of a defect in the information processing electronics. In the converter arrangement of the invention, the extremely trouble-free electronic power circuitry is therefore provided only once, while the relatively more trouble-prone electronic information circuitry is made redundant and consists of at least two complete control devices operating in parallel. A monitoring device monitors the proper operation of the control equipments. In the event of a fault in the leading control, control of the electronic power circuit is switched over to the undisturbed control unit. Also, in a preferred embodiment, a fault in the control equipment which is in standby operation is indicated.

A converter arrangement according to the invention requires little space, as the bulky electronic power circuit is provided only once and is laid out only for the intended nominal power. The investment costs therefore remain low. Due to the higher utilization of the converter, the overall efficiency of the arrangement is improved. Measures to ensure proper parallel operation of several converters are no longer required.

DETAILED DESCRIPTION OF THE INVENTION

Figure 1:
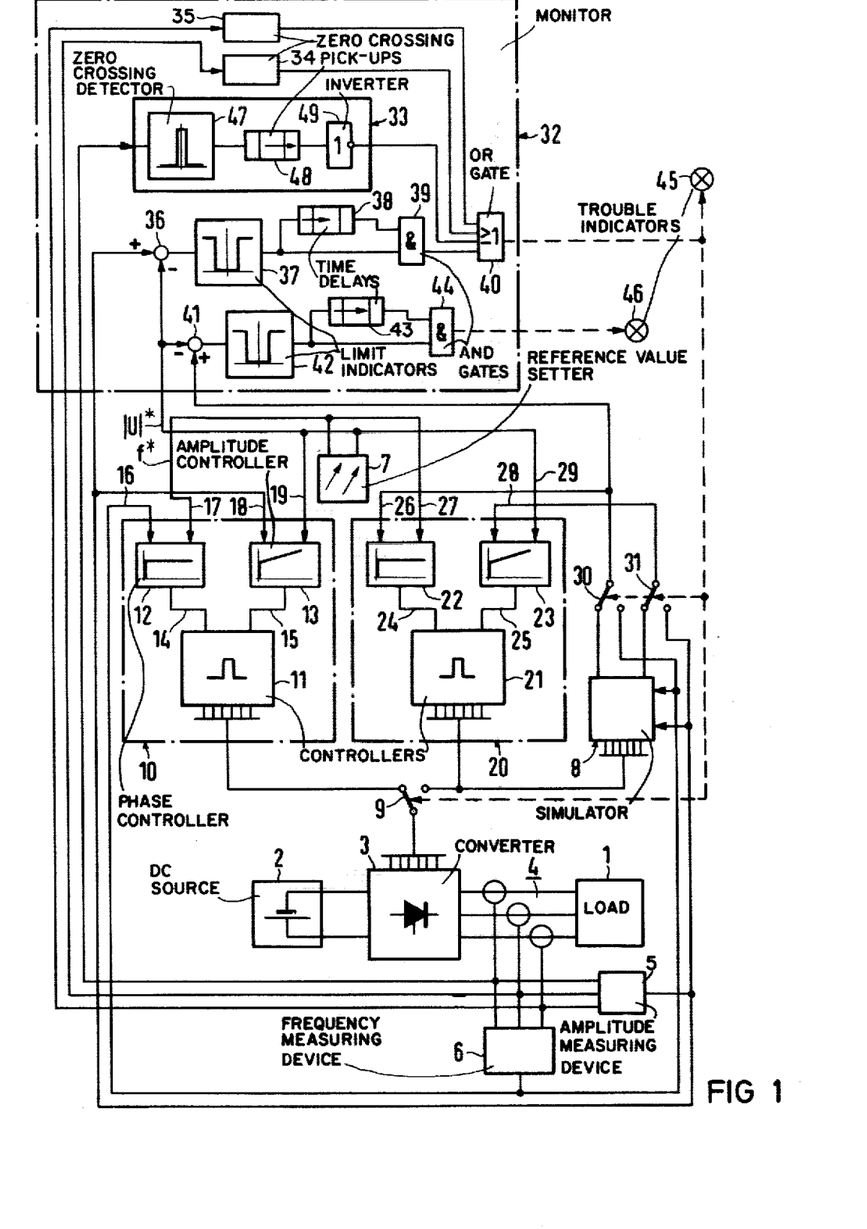
FIG. 1 is a block diagram of a preferred embodiment of the invention.

FIG. 1 is a block diagram showing a three-phase load 1 which is supplied from a DC current source 2 via a converter 3. In the embodiment shown, the converter 3 is an inverter. Current source 2 may be, for example, a battery, DC current or DC voltage intermediate link, or a DC supply network. The controlled semiconductor valves of converter 3 can be controlled by firing pulses either from a first control unit 10 or a second control unit 20. The converter 3, along with the usual firing pulse transformers and firing pulse amplifiers, not shown in detail, constitutes a power circuit (section) in the sense of the present invention.

First control unit 10 contains a first controller 11, a phase controller 12 having proportional behavior, and an amplitude controller 13 which has proportional integral behavior. Controller 11 generates firing pulses in accordance with control voltages fed to its frequency control input 14 and its amplitude control input 15.

Similarly, second control unit 20 contains a second controller 21 having a phase controller 22 connected in series with its frequency control input 24, and an amplitude controller 23 connected in series with its amplitude control input 25. Control units 10 and 20 each constitute electronic information circuits (circuitry) in the sense of the present invention.

The outputs of control units 11 and 21, which carry the firing control signals are connected, via a suitably designed double-throw switching device 9, to the firing inputs of converter 3. To simplify the explanation of the embodiment examples, only the main valves of converter 3 will be discussed. It is pointed out, however, that analogous measures can be taken if the converter circuit contains still other controlled valves, especially quenching valves. The drawing shows the position of the double-throw switching device 9 in normal, undisturbed operation. In normal operation, converter 3 is controlled by first control unit 10 by means of firing pulses from first controller 11 in response to first phase controller 12 and first amplitude controller 13.

Phase controllers 12 and 22 and amplitude controllers 13 and 23 are provided with reference value inputs 17 and 27 and 19 and 29, respectively, and are connected to the phase and amplitude outputs of a protected reference value setter 7. The actual-value input 16 of phase controller 12 is connected to a frequency measuring device 6, which, in turn, is connected to a transformer arrangement 4. Reference-value input 17 of phase controller 12 is fed the frequency reference value generated by reference-value setter 7. In the event of frequency deviations, the phase difference resulting between the frequency value and the actual frequency value is picked up by a sampling element and is stored in a holding element, the amplified output voltage of which is fed to frequency control input 14 of controller 11. Actual value input 18 of amplitude controller 13 is connected to an amplitude-measuring device 5 for the voltage amplitude, which is likewise connected to the transformer arrangement 4. Reference value input 19 of amplitude controller 13 is connected to the corresponding output of protected reference-value setter 7.

Actual-value input 26 of phase controller 22 in second control unit 20 is connected through double-throw switching device 30 to simulator model 8 which simulates converter 3 by means of electronic information circuitry. The design of simulator model 8 is explained in detail, below, with reference to FIGS. 2 and 4. Reference-value input 27 of phase controller 22, like input 17 of phase controller 22, is connected to the appropriate output of protected reference-value setter 7. Actual-value input 28 of amplitude controller 23 is connected via a double-throw device 31 to simulator model 8. Reference-value input 29 of amplitude controller 23 is connected to the other output of protected reference-value setter 7. Double-throw devices 30 and 31 are connected so that in the undisturbed condition of control unit 10, they connect actual-value inputs 26 and 28, respectively, of phase controller 22 and amplitude controller 23, to simulator model 8 and, in the event of a switching command generated by monitor 32, to frequency measuring device 6 or amplitude measuring device 5, respectively.

Monitoring device 32 serves for monitoring the output voltage of converter 3. For this purpose, zero-crossing pickups 33, 34, 35 are provided for each phase of the output voltage of converter 3. By way of simplifying the illustration, only zero-crossing pick-up 33 is shown in detail. A first reference value/actual value comparator having elements 36 to 39 and a second reference value/actual valve comparator having elements 41 to 44 are also provided.

Zero crossing pickup 33 contains a zero crossing detector 47 which delivers a short pulse to a time delay element 48, which has drop-out delay, for each zero crossing of the output voltage of the monitored phase of converter 3. The dropout delay of time delay stage 48 is one half period of the output AC voltage of converter 3. Time delay stage 48, which is triggered for each zero crossing, does not flip back when the output voltage is undisturbed, since the next zero crossing of the voltage does not occur in time. The flipping-back of time delay stage 48 is converted by an inverter 49 into an active signal which is fed to an OR gate 40. The other zero crossing pickups 34, 35 are similarly designed. Their outputs are likewise connected to the inputs of OR gate 40.

The first reference value/actual value comparator, i.e. the circuit including parts 36 to 39, monitors the amplitude of the output voltage of converter 3 with respect to the predetermined reference value. It contains a difference element 36 to which the actual value of the output voltage of converter 3, picked up by the amplitude measuring device 5 is fed as the actual value and the amplitude reference value from the protected reference value setter 7, is fed as the reference value. The difference between the reference value and the actual value is monitored by limit indicator 37. If a predetermined tolerance limit is exceeded, limit indicator 37 generates an active signal which is fed directly to the first input of an AND gate 39 and, via a time delay stage 38 having a delayed response, to the second input of the AND gate 39. If a difference between the reference value and the value of the voltage amplitude is excessively large, lasting longer than the response delay of time delay element 38, AND gate 39 conducts and delivers an active signal to the lower input of OR gate 40. OR gate 40 thus passes on an active signal when either one of the zero crossing pickups 33, 34, 35 or the first reference value/actual value comparator, 36 to 39, responds. The active output signal of OR gate 40 is used, as indicated by the dashed lines, to address an indicator 45 and to switch over the double-throw devices 9, 30 and 31.

The circuit arrangement of FIG. 1 operates as follows.

First control unit 10, having controller 11, phase controller 12 and amplitude controller 13, initially controls converter 3. Second control unit 20, having controller 21, frequency controller 22, and amplitude controller 23, is in parallel standby operation. However, the output firing pulses of controller 21 are not connected to converter 3 but, instead, are connected to simulator model 8. The output voltage of converter 3 is monitored with respect to its regular zero crossings and with respect to possible excessive deviations of the actual value of the voltage amplitude from the predetermined reference value. As soon as one of these monitors ascertains an impermissible deviation in the output voltage of converter 3, it is assumed that a defect in the control unit has occurred. Control of converter 3 is then switched over immediately to second control unit 20 and the disturbance is indicated by indicator 45. The drive of converter 3 is switched over by means of the double-throw switching devices 30 and 31 for the actual frequency value and the actual amplitude value of the output voltage of converter 3. Converter 3 continues to be controlled by second control unit 20 after the switchover. No undue voltage break occurs at the load 1 and the supply to the load is practically interruption-free.

A defect can occur in the second control unit 20 while it is in standby operation. Such a disturbance in control unit 20 must be detected and indicated immediately, since it jeopardizes the operating reliability of converter 3, should an additional disturbance occur in first control unit 10. A second reference value/actual value comparator 41 to 44 is provided for monitoring the second control unit 20; its comparator device 41 is fed the artificial actual voltage value formed by simulator 8 as the actual value and the voltage amplitude reference value, from protected reference value setter 7, as the reference value. Deviations of the artificial voltage amplitude from the reference value are monitored by limit indicator 42, the output signal of which is given directly to one input of AND gate 44 and, via a time delay stage 43 with delayed response, to the second input of AND gate 44. If the deviation of the voltage amplitude reference value from the artificial voltage amplitude actual value generated by the model is excessive, it is concluded that there is a defect in control unit 20 or in simulator model 8. The active output signal of AND gate 44 then addresses a suitable trouble indicator 46. The disturbed second control unit 20 or the disturbed simulator model 8 must then be checked and repaired immediately.

Figure 2:
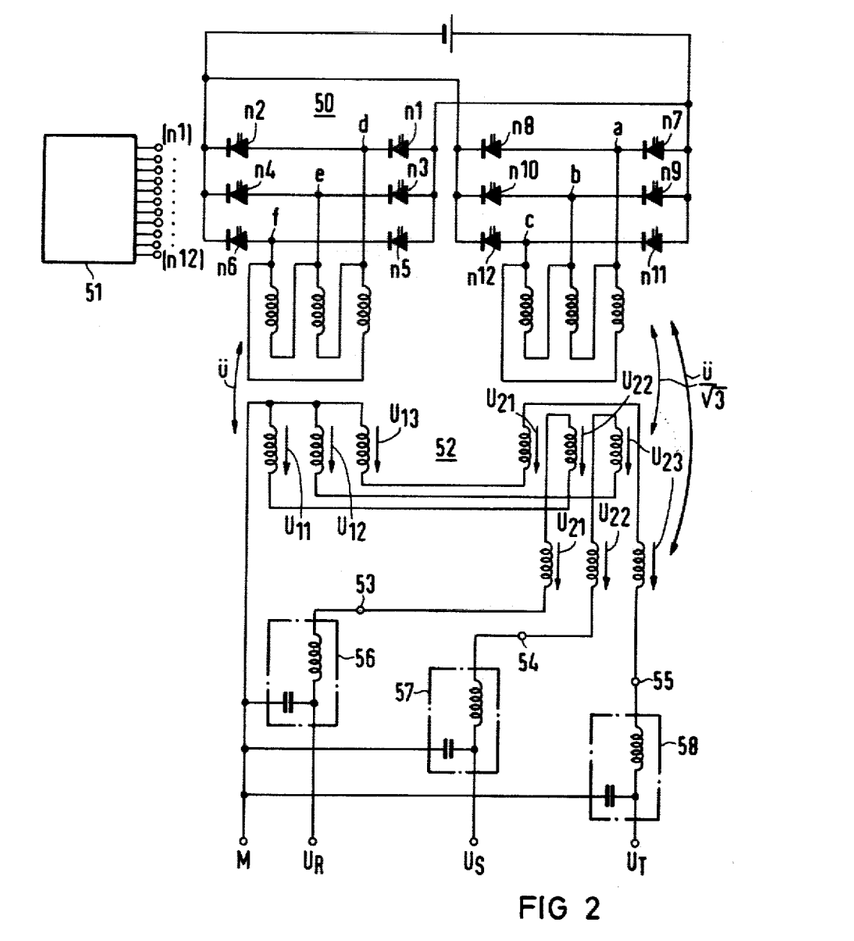
FIG. 2 is a circuit diagram of a power inverter useful in the circuit of FIG. 1.
Figure 3:
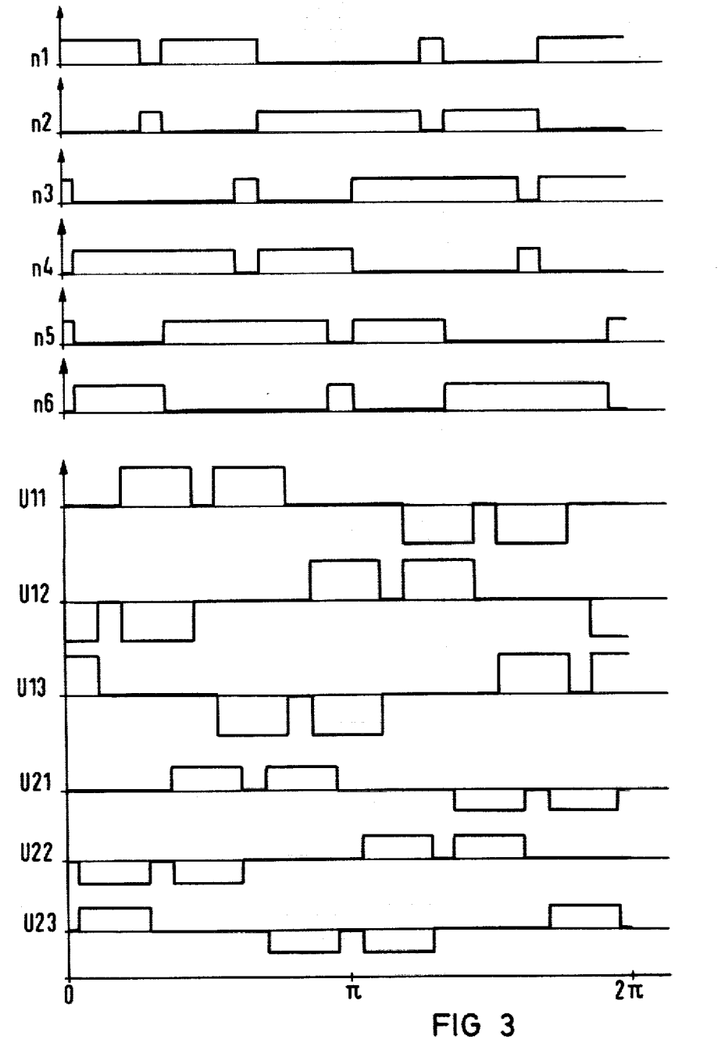
FIG. 3 illustrates important signal waveforms in the inverter of FIG. 2.
Figure 4:
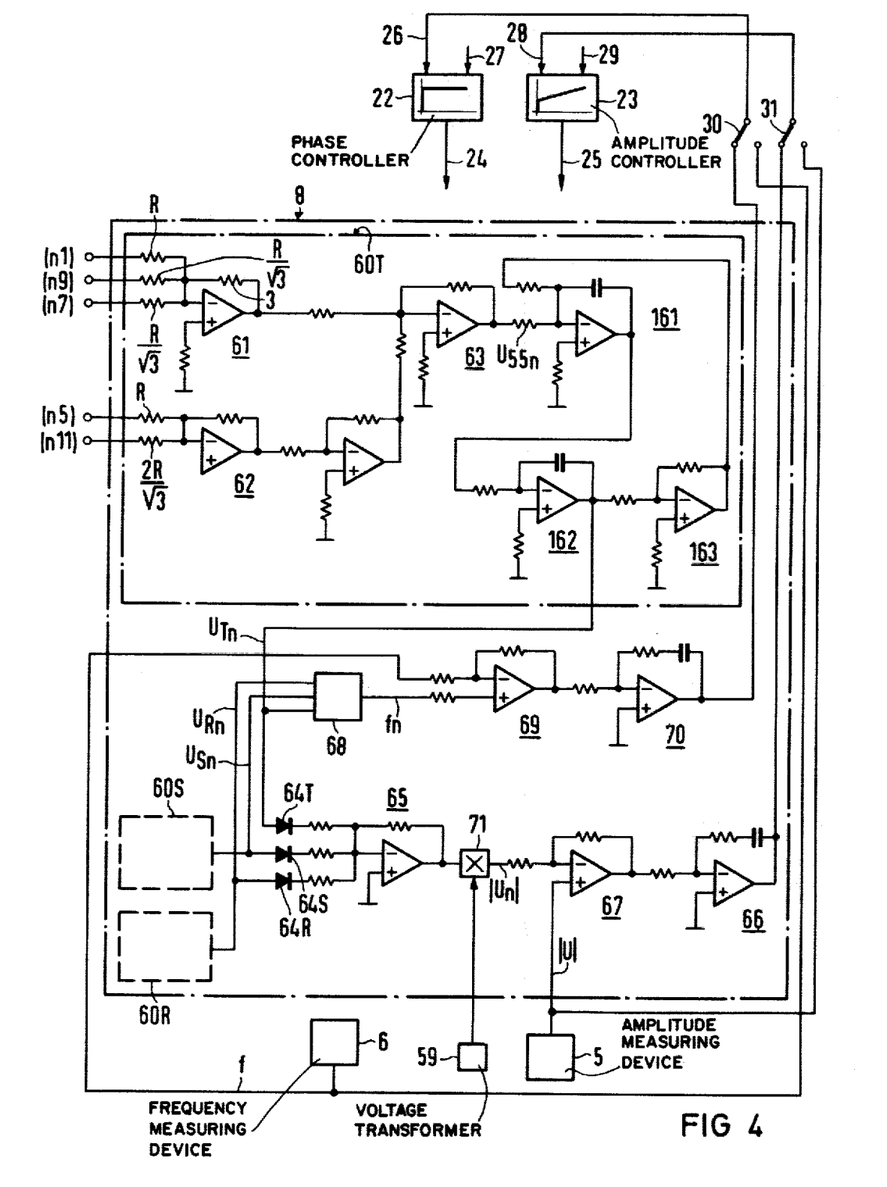
FIG. 4 is a circuit of an inverter simulator useful in FIG. 1.

FIGS. 2, 3 and 4 show an illustrative embodiment of a converter and of an electronic simulator of a converter. FIG. 3 illustrates the waveform of the control pulses and the phase voltages of the power converter of FIG. 2. FIG. 4 shows the design of an electronic simulator of the power converter of FIG. 2.

In FIG. 2 the converter is a twelve-pulse inverter 50, shown in a simplified presentation, with valves that can be fired and quenched in two bridge circuits with three bridge arms each. In the following, only the twelve main valves n1 to n12 will be considered. In this simplified presentation, the quenching valves need not be explained. The main valves n1 to n12 are addressed by firing pulses from a control unit, shown as block 51. The centers a to f of the bridge branches are connected to the primary windings of a transformer arrangement 52. Voltages $U_a$ to $U_f$ appear at centers a to f. Transformer arrangement 52 consists of subtransformers in Y-delta-Y and Y-Z connection, the windings being connected together in the manner shown. The transformation ratios of the individual subtransformers are given as ü and ü/$\sqrt{3}$, respectively. In the secondary windings of the subtransfomers, secondary voltages $U_{11}$, $U_{12}$, $U_{13}$ and $U_{21}$, $U_{22}$, $U_{23}$ are induced. Square wave voltages $U_{53}$, $U_{54}$, $U_{55}$ appear at output terminals 53, 54, 55 of the transformer arrangement 52 and are passed on via lowpass filters 56, 57 and 58. Lowpass filters 56, 57 and 58 transform the square wave voltages into sinusoidal phase voltages $U_R$, $U_S$, $U_T$, which represent the supply voltage for the load.

FIG. 3 shows the pulse pattern of the firing pulses for controlled main valves n1 to n6 for the left-hand bridge circuit of inverter 50, plotted over one period of the AC voltage. The firing pulses for main valves n7 to n12 of the right-hand bridge circuit are shifted 30° relative thereto. FIG. 3 also shows the waveforms of secondary voltages $U_{11}$, $U_{12}$, $U_{13}$, and $U_{21}$, $U_{22}$, $U_{23}$. The squarewave phase voltages $U_{53}$, $U_{54}$, $U_{55}$ at the outputs of transformer arrangement 52 can be determined directly from the secondary voltages. For the squarewave voltage $U_{55}$ at the output 55, for instance, one obtains:

$$U_{55} = (U_d - U_f)\ddot{u} + (U_b - U_c)\frac{\ddot{u}}{\sqrt{3}} + (U_a - U_c)\frac{\ddot{u}}{\sqrt{3}}$$

From the equation above, one can directly derive the model circuit of FIG. 4 for generating simulated phase voltages and a simulated sum voltage from the firing control pulses of control unit 51. For generating the simulated phase voltages $U_{Rn}$, $U_{Sn}$, and $U_{Tn}$, circuit arrangements 60R, 60S, and 60T are provided, of which only the circuit 60T is shown in detail. Circuit 60T, for simulating the phase $U_{Tn}$, contains a first summing amplifier 61, the inverting input of which is connected, via a first input resistor havng a resistance R, to the firing control line for valve n1, as well as, via a second input resistor with resistance R/$\sqrt{3}$, to the firing control line for valve n9, and also, via a third input resistor having a resistance R/$\sqrt{3}$, to the firing control line for valve n7. The inverting input of a second summing amplifier 62 is connected, via an input resistor with resistance R, to the firing control line for valve n5 and, via another input resistor with resistance 2R/$\sqrt{3}$, to the firing control line for valve n11. The output voltage of summing amplifier 61 and the inverted output voltage of summing amplifier 62 are combined in a third summing amplifier 63. The output voltage of third summing amplifier 63 represents a simulated squarewave voltage $U_{55n}$. The simulated squarewave voltage $U_{55n}$ is fed to a simulated filter which comprises two integrators 161 and 162 connected in series and an integrating amplifier 163. Integrator 161 simulates the series inductance of a lowpass filter; integrator 162 simulates the shunt capacitance of a lowpass filter; and the inverted output voltage of second integrator 162 is fed back to the input of first integrator 161 via integrator 163. A simulated sinusoidal phase voltage $U_{Tn}$ appears at the output of the simulated filter thus substituted.

The other circuit arrangements 60R and 60S are of similar design and generate simulated sinusoidal phase voltages $U_{Rn}$ and $U_{Sn}$. The simulated phase voltages, forming a three-phase system, $U_{Rn}$, $U_{Sn}$ and $U_{Tn}$, are passed on via rectifier circuits 64R, 64S and 64T respectively, for formation of the absolute value and are added in a summing amplifier 65. The output voltage of summing amplifier 65 is multiplied in a multiplier 71 by a proportionality factor, preferably a measured value for the voltage of current source 2, as measured by a voltage transformer 59. The output voltage of multiplier 71 represents a simulated absolute voltage value $|U_n|$. The simulated absolute voltage value $|U_n|$, however, cannot be used directly as the artificial actual value of the absolute value. Rather, provision must be made so that amplitude control loops 13 and 23 in the two control units 10 and 20 do not diverge. For this purpose, servo control 66 is provided, the inverting input of which is connected to a differential amplifier 67. Differential amplifier 67 forms the difference of the simulated absolute value $|U_n|$ and the absolute voltage value $|U|$ of the voltage measuring device 5. The output voltage of servo control 66 is fed via double-throw device 31 to the actual/value input 28 of voltage amplitude control 23 in second control unit 20. If the simulated absolute voltage deviates from the measured absolute voltage, the output voltage of amplitude control 23 is influenced in such a manner that the deviation is reduced to zero. In this manner, continuous synchronism of voltage controls 13 and 23 in the control units 10 and 20 is assured.

The simulated phase voltages $U_{Rn}$, $U_{Sn}$ and $U_{Tn}$ are also fed to a frequency measuring device 68, which can be of known design. The frequency measuring device 68 furnishes a simulated frequency value $f_n$, which is compared in a difference element 69 with the measured frequency value f. The output voltage of differential stage 69 drives another servo control 70, the output voltage of which is fed, via the double-throw switching device 30, to the actual-value input 26 of phase controller 22 in control unit 20.

If the simulated frequency value differs from the measured frequency value, the voltage fed to the actual-value input 26 of phase controller 22 is influenced in such a manner that the deviation is reduced to zero.

By making amplitude controller 23 and phase controller 22 in second control unit 20 follow, continuous synchronism (tracking) of the corresponding control devices and therefore, also, of controllers 11 and 21 is assured, and identical firing pulse patterns are generated. This makes it possible to switch from first control unit 10 to second control unit 20 at any time without the occurrence of an interruption or a phase jump of the load voltage.

Figure 5:
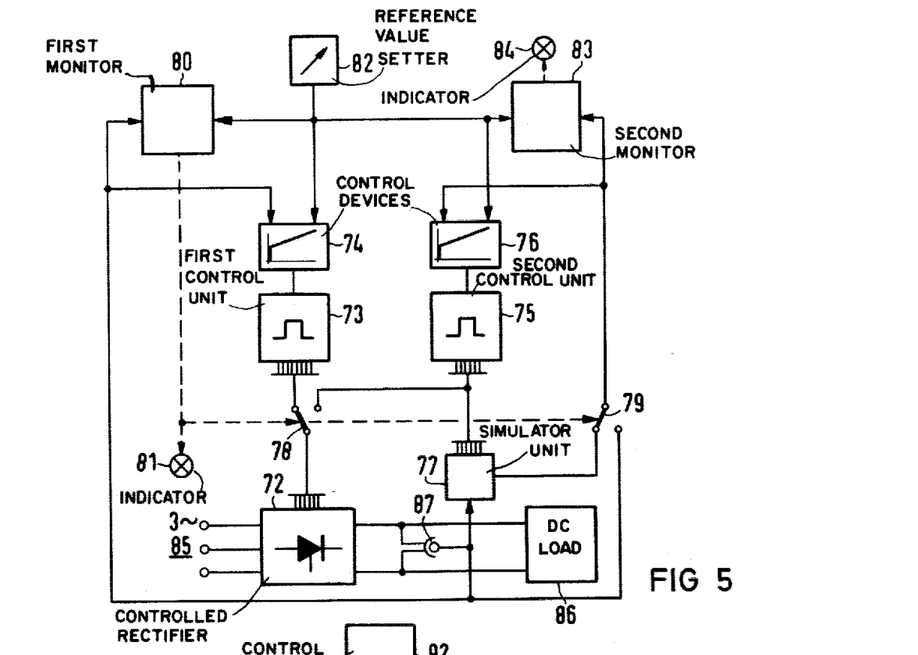
FIG. 5 shows a circuit embodying the invention with a controlled rectifier.

FIG. 5 shows the application of the invention to a controlled rectifier 72 for supplying a DC load 86 from threephase network 85. The semiconductor valves of controlled rectifier 72 are controlled by firing pulses from either a first control unit 73 or a second control unit 75 and which are fed to it by means of a double-throw switching device 78. First control unit 72 is preceded by a first control device 74 and second control unit 75 is preceded by a second control device 76. The control devices may be designed as voltage regulators or current regulators or as combined voltage and current regulators. In the following description, it assumed that control devices 74 and 76 are voltage regulators. An actual-voltage value is fed to control device 74, by a measuring transformer 87 and a voltage reference value, by a reference-voltage setter 82. A setting device or, in particular, a superimposed control device may be provided. The reference value is also fed by reference value setter 82 to second control device 76; and the actual value is fed, via double-throw switching device 79, from simulator model 77. Model 77 is, again, an electronic simulation of controlled rectifier 72; it forms the simulated actual values for the second control device and for monitoring it.

For monitoring the first electronic information circuit having first controlled unit 73 and first control device 74, a first monitor 80 is provided, which is designed as a reference value/actual value comparator. If the deviation between the reference value and the actual value of the output voltage of controlled rectifier 72 is excessively large, a trouble indication is made at trouble indicator 81. At the same time, double-throw switching devices 78 and 79 are switched over and controlled rectifier 72 is then controlled via the second electronic information circuit including second controller 75 and second control device 76.

To continuously monitor the second electronic information circuit 75, 76, a second monitor 83 is provided which continuously compares the reference value from the reference-value setter 82 with the simulated actual value from model 77. If the difference is excessive, a trouble indication appears at an indicator 84, meaning that a disturbance has occurred either in the second controller 75, the second control device 76, or in simulator model 77 which must be immediately corrected.

Figure 6:
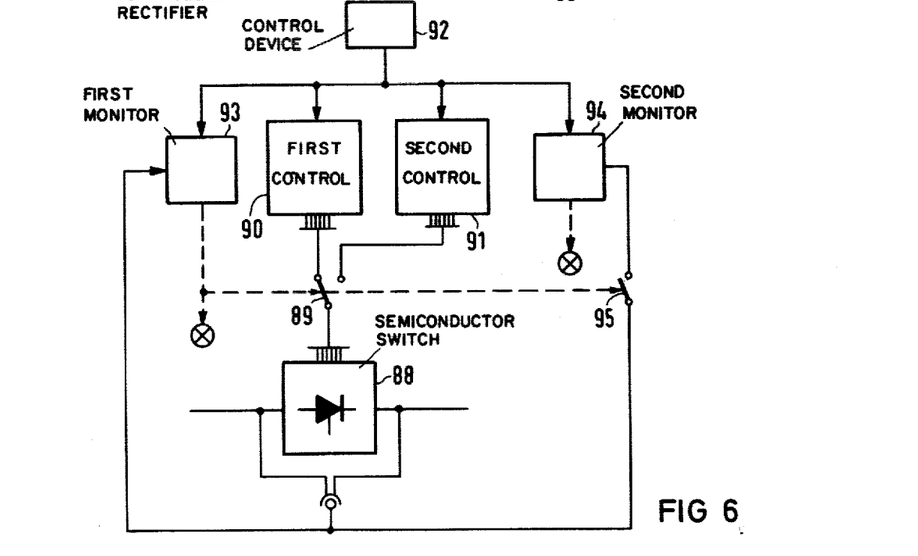
FIG. 6 shows a circuit embodying the invention for use with a controlled semiconductor power switch.

FIG. 6 shows the application of the invention to a semiconductor switch 88, which can be designed, for instance, as a semiconductor switch with forced commutation. Semiconductor switch 88 is controlled by signals fed through a double-throw switching device 89, either from first control 90 or from second control 91 in accordance with control commands which are formed by a superimposed control device 92. A first monitor 93 is associated with first control 90 and a second monitor 94 with the second control 91. There are several ways of monitoring such a switch. For instance, the current through the switch or the voltage across the switch, as in the example shown, can be measured. In both cases it can be seen from the corresponding measurement values whether the switch is on or off. The control commands from the superimposed control device 92 are likewise fed to monitor 93. Monitor 93 determines therefrom whether switch 88 must be in the conducting state according to the control commands, or in the cut-off state, and compares this with the answer-back signal. If the desired state of the switch does not coincide with its actual state, a disturbance is indicated and, at the same time, double-throw switching devices 89 and 95 are switched over. Switch 88 is then controlled by means of second control 91, according to the same control commands. The actual state of switch 88 is now reported through switch 95 to monitor 94, which is associated with control 91.

Figure 7A:
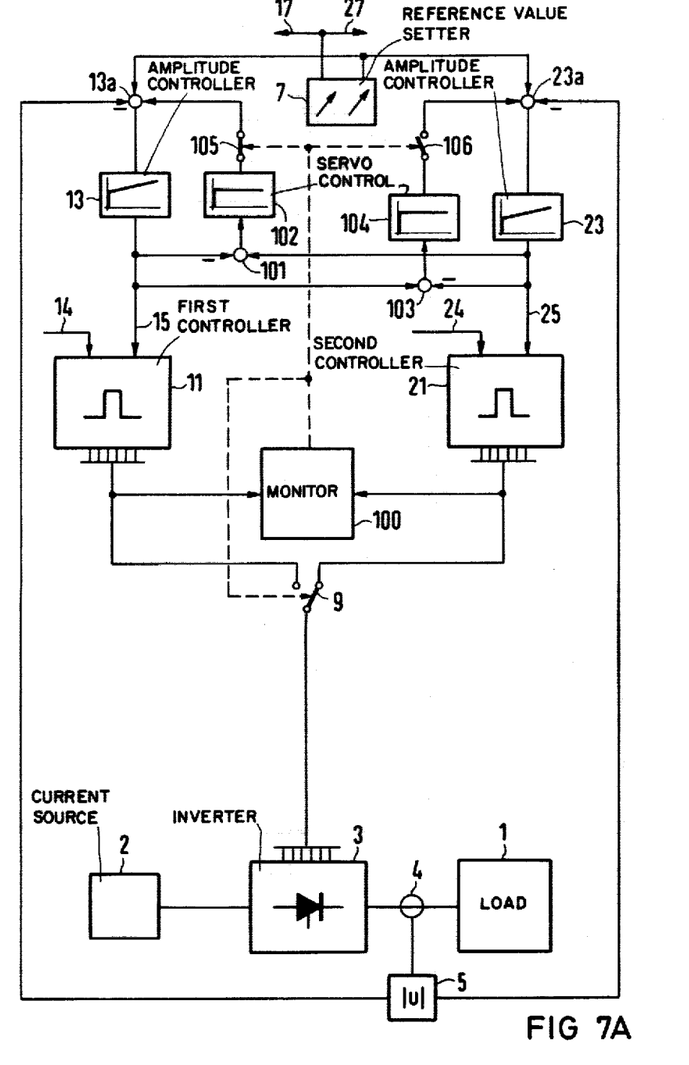
FIGS. 7A and 7B are block diagrams illustrating an alternative embodiment of the invention as applied to an inverter.
Figure 7B:
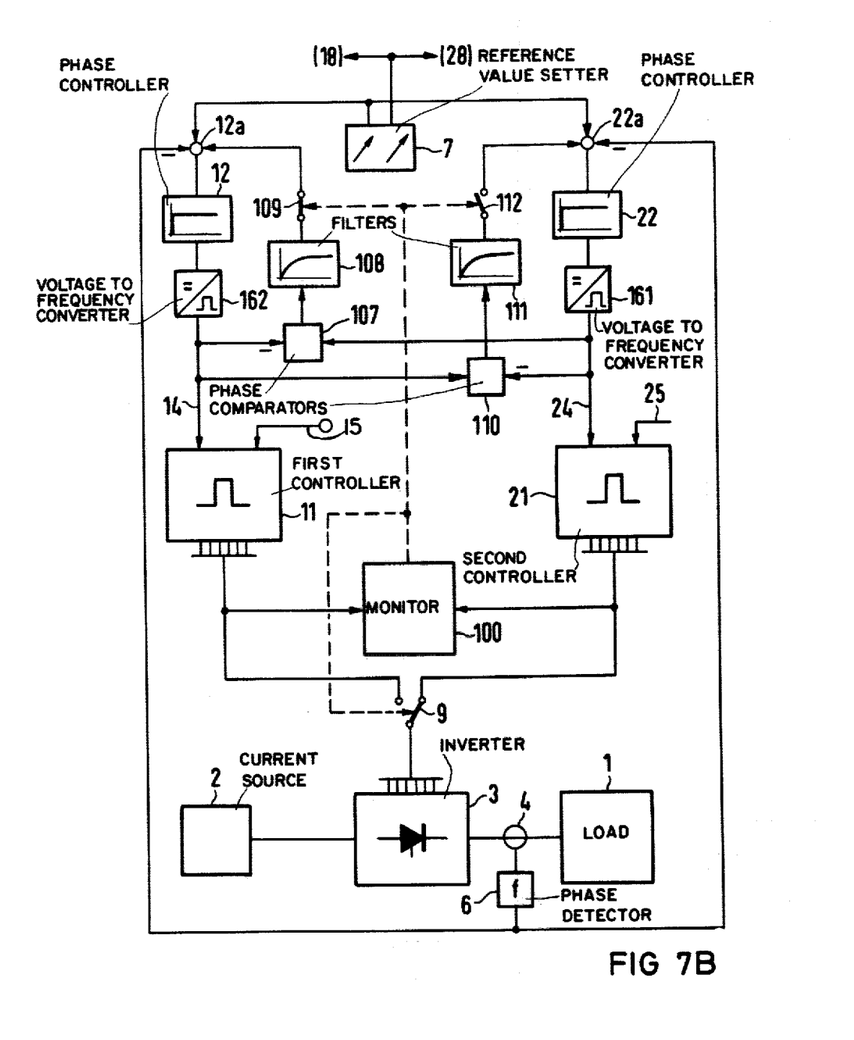

FIGS. 7A and 7B show an alternative embodiment of the invention as applied to a converter with redundantly designed electronic information circuitry. FIG. 7A shows a follow-up circuit of the voltage amplitude control, and FIG. 7B shows a follow-up circuit of the phase control of the respective control units. Presenting the two control functions separately allows simpler explanation of the relationships but, it will be understood that they act together. In these drawings like and like-acting components from FIGS. 1 to 6 are designated with the same reference symbols.

FIGS. 7A and 7B both show inverter 3 supplying load 1 from current source 2; the controlled semiconductor valves of inverter 3 are controlled, via double-throw switching device 9, either by first controller 11 or second controller 21. Controller 11 is again preceded by a phase controller 12 (shown in FIG. 7B) or by an amplitude controller 13 (See FIG. 7A), while controller 21 is preceded by a phase controller 22 (shown in FIG. 7B) and an amplitude controller 23 (FIG. 7A). The control units with their respective control devices again form electronic information circuits as defined herein. For monitoring this electronic information circuit, a monitor 100 is provided, the design and operation of which will be described first with the aid of FIG. 8.

Figure 8:
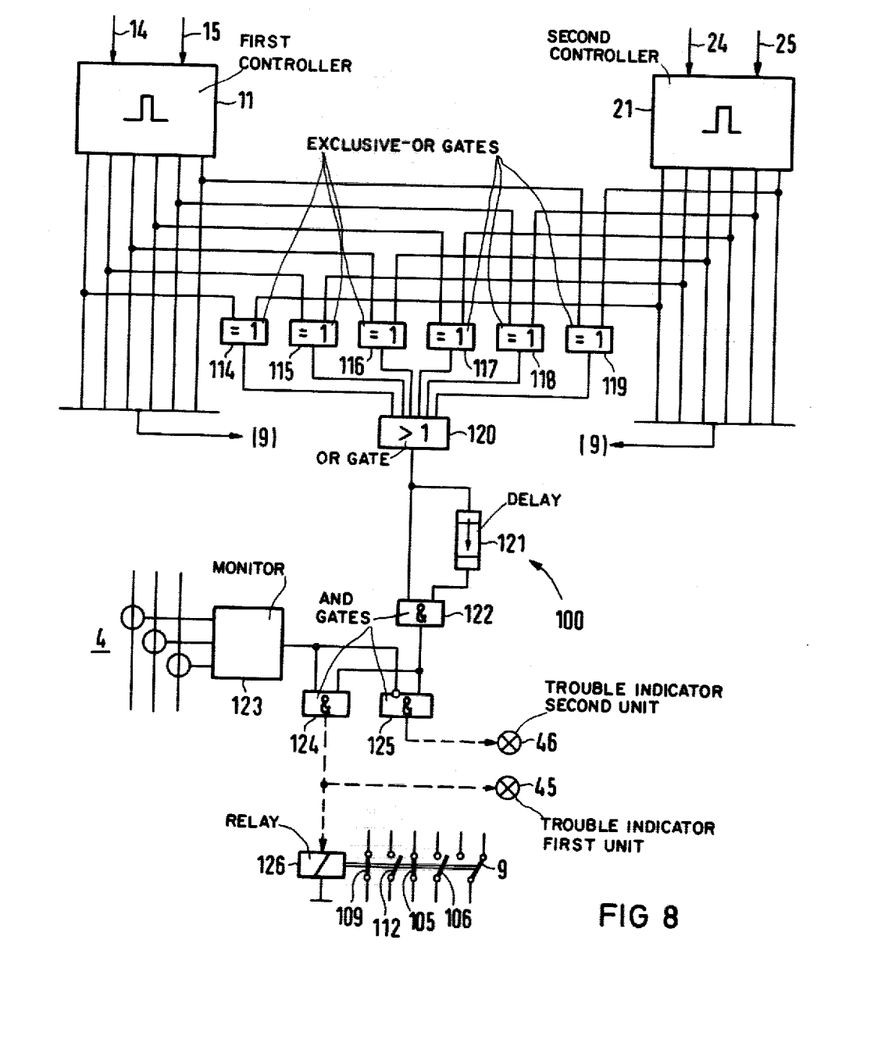
FIG. 8 is an embodiment of a control unit monitor for use within the circuit of FIGS. 7A and 7B.

FIG. 8 shows a monitor interconnected with two controllers 11 and 21. The outputs of controllers 11 and 21, which are engaged by the respective firing pulses for the same valve of the converter, are connected to the inputs of one of the EXCLUSIVE-OR gates 114 to 119. An EXCLUSIVE-OR gate generates a logical 1 signal at its output only if one input carries 0-signal and the other input carries 1-signal. If the input signals are the same, the EXCLUSIVE-OR gate has a 0-signal at the output. The outputs of the six EXCLUSIVE-OR gates 114 to 119 are connected disjunctively in OR gate 120. OR gate 120 is followed by AND gate 122, one input of which is connected directly to the output of OR gate 120 and the other input of which is also connected, but via time delay stage 121, to the output of OR gate 120.

As long as the firing pulses of controllers 11 and 21 form an identical pulse raster, either 1-signals or 0-signals are simultaneously present at both inputs of EXCLUSIVE-OR gates 114 to 119. Then the outputs of EXCLUSIVE-OR gates 114 to 119 carry 0-signals. If, however, two norminally simultaneous firing pulses appear which differ in time from each other, be it that one pulse of controller 11 is longer or shorter than the corresponding pulse of the controller 21, or is missing altogether, or is shifted in time, then a 1-signal at the output of the EXCLUSIVE-OR gate in question triggers time delay stage 121 via OR gate 120. If the difference in time of the firing pulses is smaller than the response time of delay stage 121, then no trouble signal appears at the output of AND gate 122. If, on the other hand, the difference in time of the firing control signal exceeds the response delay of time delay stage 121, then an active signal is delivered at the output of AND gate 122. This signal can optionally also be stored.

An active output signal of AND gate 122 thus appears when the firing pulse rasters of controllers 11 and 21 differ from each other, at least with respect to one firing pulse. From this, a conclusion can be drawn as to trouble in one of the two controllers. However, the question of whether the first or the second control unit is disturbed is still open. In order to determine this, the output voltage of the converter is monitored. For this purpose, a voltage monitor 123 is provided which is connected to measuring transformer 4. A reference value/actual value comparator can be used as voltage monitor 123, such as is shown and described in FIG. 1. However, a voltage monitor of the type described in German Pat. No. 23 48 415, German Offenlegungsschrift No. 26 37 397, or German Offenlegungsschrift 27 18 591 can also be used. Voltage monitor 123 is connected to an AND gate 124 and to the inverting input of a another AND gate 125. The second inputs of AND gates 124 and 125 are connnected to the output of AND gate 122. If AND gate 122 generates an active trouble signal output and, at the same time, voltage monitor 123 generates an active trouble signal, then AND gate 124 conducts; its active output signal means that the first control unit, which includes controller 11, phase controller 12 and amplitude controller 13, is disturbed. The active output signal of AND gate 124 is used, as indicated by the broken lines, to activate a relay 126, the illustrated contacts of which represent switching devices 109, 112, 105, 106 and double-throw switching device 9. (It will be understood that in constructing the actual circuit, electronic switches will preferably be used.) Indication of this disturbance is also given by trouble indicator 45. If, on the other hand, AND gate 122 carries an active trouble signal while voltage monitor 123 does not, then the fault is in the second control unit, which includes controller 21, phase controller 22 and amplitude controller 23. Such a disturbance is indicated by indicator 46. The defective part of the second control unit can then be repaired immediately.

Monitoring for agreement between the pulse rasters of the firing pulses of two controllers 11 and 21 in the manner described is possible only if the pulse patterns actually coincide in the undisturbed condition. This, however, presupposes that the same control voltages are fed to both controllers at the amplitude control input as well as at the frequency control input. Since one of the two control units is always connected through to the converter, the control loops of this control unit are not closed and tracking of the two control units is not possible without further measures. Tracking of the two control units can be forced, for instance, if an electronic model of the converter is used which is addressed by the firing pulses of a control unit and which furnishes simulated actual values for the respective control loops. This approach was disclosed in the embodiment illustrated in FIG. 1. FIGS. 7A and 7B show another approach, the advantage of which is that neither of the two control units is favored over the other. Then, an electronic model of a converter is not required. Monitoring and tracking of the controls is thus independent of the converter circuit used and can be employed with any kind of converter. A further advantage lies in the fact that, in the event of a disturbance in one control unit, a transfer to the undisturbed second control unit can be made and the second unit can then continue to control the converter after the disturbance is corrected. The initially disturbed control unit then remains on standby (as a spare), after it has been repaired, and until a disturbance in the second control unit occurs. This is explained in the following.

FIG. 7A shows the input to amplitude controller 23 as derived from a series-connected comparator 23a connected in series with it, to which are fed a predetermined reference value for the voltage amplitude from reference value setter 7, the actual value of the voltage amplitude from measuring device 5 (in the subtracting connection), and, via a switching device 106, the output signal of a servo control 104. The output of amplitude controller 21 is connected to amplifier control input 25 of controller 21. The connection to frequency control input 24 is shown in FIG. 7B.

The input of servo control 104 is connected to a difference element 103 which is connected to amplitude control input 15 of controller 11 and, at the subtracting connection, to amplitude control input 25 of controller 21. When a difference exists between the control voltages at amplitude control inputs 15 and 25 to controllers 11 and 21, the difference between these voltages is formed in difference element 103 and is fed, via servo control 104, to amplitude controller 23 and comparator 23a as a connection signal, when switch 106 is the closed position. In the drawing, converter 3 is shown as controlled by controller 21; i.e., controller 21 and its preceding control devices is the leading control. In that case, no correction signal need be fed to the amplitude controller. Switch 106 is therefore open.

Similarly, difference element 13a at the input of amplitude controller 13 of controller 11 is acted upon by the reference value of the voltage amplitude, the actual value, and a correction signal is formed by a correction control 102 which is preceded, on the input side, by a difference element 101. The latter is, in turn, connected to amplitude control input 15 of controller 11 and amplitude control input 25 of controller 21. If a difference between the two amplitude control voltages occurs, servo control 102 forms a correction signal which, via switch 105, influences amplitude controller 103 so that its output signal coincides with that of leading amplitude controller 23.

FIG. 7B illustrates the tracking of the phase controllers. Frequency control input 24 of controller 21 is connected by way of a voltage-frequency converter 161 to phase controller 22, which, in turn derives its input from the preceding difference element 22a. Difference element 22a has, as inputs, the phase reference value from reference value setter 7, the actual phase value from detector 6, and a correction voltage by way of a switch 112. The correction voltage is formed in a phase comparator 110 from the pulse frequencies on frequency control input lines 14 and 24 of controllers 11 and 21, respectively, and is guided by way of a filter element 111.

Similarly, the frequency control input 14 of controller 11 is connected by way of a voltage-frequency converter 161 to phase controller 12, which derives its input from difference element 12a. Difference element 12a has, as inputs, the phase reference value, the actual phase value, and, by way of a switch 109, a correction voltage. The correction voltage is formed in phase comparator 107 from the pulse frequencies on the frequency control input lines 14 and 24 of the two controllers 11 and 21, respectively, and is conducted way of a filter member 108.

Voltage frequency converters 161 and 162 are shown separately, being standard in controllers for converters of a frequency control voltage into a control pulse frequency. Differences in the input control pulse frequencies of the two controllers 11 and 21 are generated by the phase comparators 107 and 110 and, after appropriate smoothing, supplied to the stand-by phase regulator as a correction voltage. In FIG. 7B, the correction voltage, transmitted to phase regulator 12, by way of the closed switch 109, acts on it in such way that its output voltage coincides with that of leading phase regulator 22.

Figure 9:
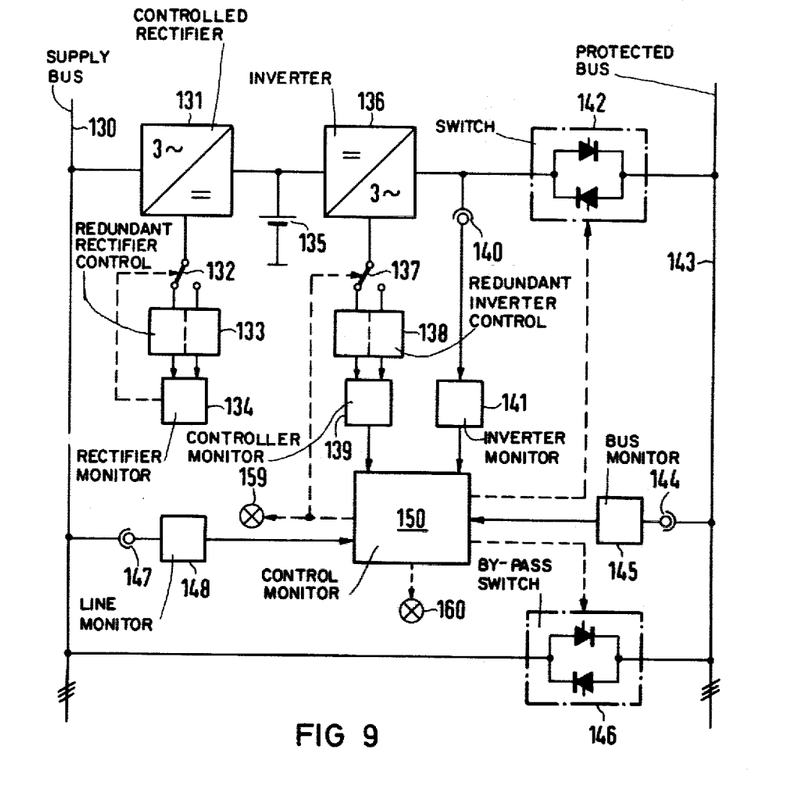
FIG. 9 is a block diagram of a converter control arrangement, according to the invention, in an interruption-free power supply.

A preferred application of the invention is in interruption-free power supplies. FIG. 9 is a block diagram of such a system. In it, controlled rectifier 131 is connected to a three-phase system 130 via a line transformer (not shown). Firing pulses are supplied to controlled rectifier 131 by a redundant rectifier control device 133, via a double-throw switching device 132, all designed in accordance with the invention. A monitor 134 is associated with redundant rectifier control device 133 and activates double-throw switching device 132 when a fault occurs in one of the two electronic information circuits of redundant rectifier control device 133. The design of redundant rectifier control device 133 and of associated monitor 134 can be, for instance, of the type shown in FIG. 5, or in FIGS. 7A, 7B, and 8.

The output voltage of controlled rectifier 131 is fed, via a filter stage (not shown), to a battery 135 as the charging voltage. Battery 135 is connected, via an input filter (not shown) to an inverter 136 having controlled semiconductor valves. Inverter 136 is controlled by means of firing pulses supplied, via a double-throw switching device 137, by a redundant inverter control device 138 which is designed in accordance with the invention. A monitor 139, associated with redundant inverter control device 138, is designated as "controller monitor" in the following. Controller monitor 139 sends a trouble signal to a central monitoring device 150 in the event of a disturbance in one of the electronic information circuits of inverter control device 138.

A protected bus bar 143, to which loads (not shown) are connected, is fed by inverter 136, via an inverter transformer and filter (not shown) and a switch 142. Switch 142 may be a mechanical switch or, as shown here, a semi-conductor power switch. In undisturbed operation, protected bus 143 is supplied from three-phase supply network 130 via rectifier 131, battery 135, inverter 136 and switch 142, which is switched into conduction. In the event of a disturbance or a failure of three-phase supply network 130, the supply of protected bus 143 continues without interruption by drawing energy from battery 135. In this interruption-free power supply, rectifier 131 and inverter 136 operate continuously. The advantage of such an installation, in addition to the completely interruption-free supply of the protected bus, is also that no switching action is required in the event of a disturbance or a failure of the supply network 130.

In the case of disturbances in redundant rectifier control unit 133 or redundant inverter control unit 138, switching takes place in the appropriate control unit in the manner described above. However, to make possible continued energy supply to protected bus 143 in the event of a disturbance in the power section of inverter 136, protected bus 143 can be directly connected, via a further switch 146, to three-phase supply network 130. By-pass switch 146 can be designed as a mechanical switch or as a semiconductor power switch, like switch 142. Switch 146 is normally open (e.g. in the cut-off state). In the event of a disturbance in the power section of inverter 136, switch 142 cuts off and switch 146 is switched into conduction. Protected bus 143 is now supplied directly from three-phase supply network 130. Assuming that a disturbance in the power section of inverter 136 and a disturbance in supply network 130 do not occur simultaneously, the availability of the protected bus 143 is thus further ensured.

A central monitoring device 150 is provided for monitoring the entire installation and for controlling double-throw switching device 137 and switches 142 and 146. It is connected, as already explained, to controller monitor 139 of redundant control unit 138 of inverter 136. Central monitor 150 is also connected to an inverter monitor 141, to which, for instance, the output voltages of inverter 136, taken off at a voltage transformer arrangement 140, are fed as input signals. Inverter monitor 141 generates a trouble signal when the output voltage of the inverter deviates from a predetermined tolerance range. Central monitor 150 is also connected to a bus-monitoring device 145, to which, for instance, the phase voltages of the protected bus, taken off at a voltage transformer arrangement 144, are fed as input signals representing the load voltage. Bus monitor 145 generates a trouble signal when the bus voltage falls outside a predetermined tolerance range. Finally, central monitor 150 is also connected to a line voltage monitor 148, to which the phase voltage of the three-phase supply network 130, taken off at a voltage transformer 147, are fed as input signals. The line voltage monitor 148 generates a trouble signal when the line voltage falls outside a predetermined tolerance range.

Control unit monitor 139 is constructed in accordance with the teachings of the invention. Inverter monitor 141, bus voltage monitor 145 and line voltage monitor 148 may be constructed in a number of ways known in the art and may contain, for instance, absolute-value monitors and zero-crossing monitors such as are shown in FIG. 1. Central monitor 150 also controls indicators 159 and 160. Indicator 159 is activated when the electronic information circuit which happens to be leading (controlling) in inverter control unit 138 is disturbed. Indicator 160 is activated when the electronic information circuit in inverter control unit 138, idling in standby operation, is disturbed.

Figure 10:
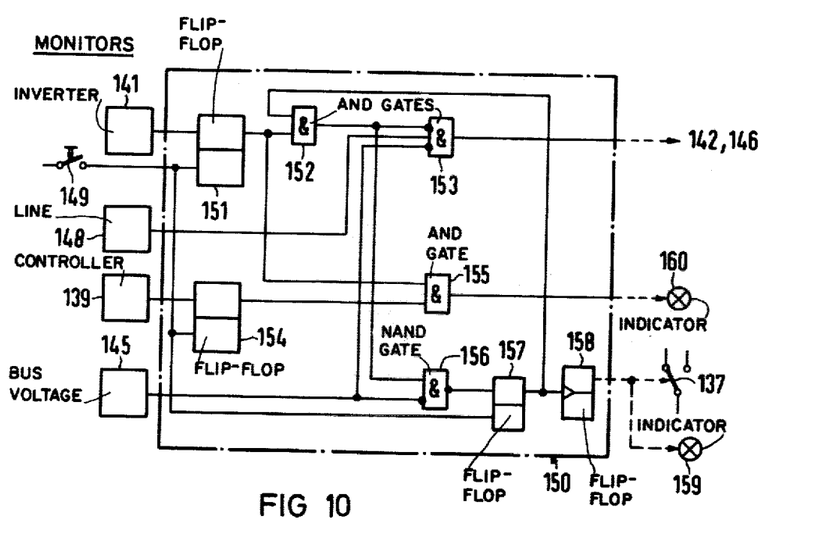
FIG. 10 is a block diagram of a central monitor in the power supply of FIG. 9.

FIG. 10 shows, in a block diagram, a preferred embodiment of monitoring device 150. It has, as inputs, signals connected from inverter monitor 141, line voltage monitor 148, controller monitor 139 and bus voltage monitor 145. The monitors mentioned generate as trouble signals, null signals, which are stored and interlinked in logic circuits to form control signals.

The inverting input of a NAND gate 156 is connected to bus voltage monitor 145. The noninverting input of NAND gate 156 is connected to the output of an AND gate 152, one input of which is connected to the output of a store (flipflop) 151 and the other of which is connected to the output of a store (flipflop) 157. In the undisturbed condition, the stores 151 and 157 are cleared. A 0-signal is thus present at the noninverting input of NAND gate 156, and 1-signal at the inverting input. A 1-signal, therefore, appears at the output of NAND gate 156. As soon as a 0-signal appears as a trouble signal from bus voltage monitor 145, NAND gate 156 is switched into conduction, so that a 0-signal appears at its output. This 0-signal represents a switch-over command for switching the information level in inverter control device 138. The switchover command clears store 157, the output of which is connected to a flipflop 158. Store 157 serves to prevent impermissible switchovers. The output signal flipflop 158 controls double-throw switching device 137 for the firing pulses of the inverter, as well as double-throw switching devices in inverter control 138 and indicator 159. Thus, the state of flipflop 158 determines which of the two information planes of inverter control device 138 controls the inverter.

The output signal of store (flipflops) 157 also serves as a blocking signal for AND gate 152, with the result that, after the information planes are switched over, switching to direct supply network operation remains as the only alternative.

We now start again from the undisturbed condition. All stores (storage devices or flipflops) are set. A 0-signal from store 157 is present at the input of AND gate 152 as well as an 0-signal from the store 151. AND gate 152 carries a 0-signal at its output. The 0-signal from AND gate 152 is therefore present at the upper inverting input of another AND gate 153. Gate 153, also has, at its lower inverting input, a 1-signal from bus voltage monitor 145 and at its central, non-inverting, input, a 1-signal from line voltage monitor 148. In the undisturbed condition, the output of AND gate 143 therefore carries a 0-signal. Upon trouble indication by inverter monitor 141, store 151 is cleared and AND gate 152 is switched into conduction. A 1-signal appears at the upper inverting input of AND gate 153. A 1-signal from bus voltage monitor 145 also appears at the lower inverting input of AND gate 153. If fault signals are reported by inverter monitor 141 as well as by bus voltage monitor 145, AND gate 153 conducts and has a 1-signal at its output. This 1-signal is interpreted as a command for switchover from inverter operation to direct supply from the network and serves to control switching devices 142 and 146. However, such a switchover command comes about only if the line voltage monitor does not likewise carry trouble signal. This prevents switching to a disturbed network.

We will start out again with an undisturbed state. The stores 151 and 154 are set. Their outputs, which are connected to the inputs of another AND gate 155, each carry a 0-signal. AND gate 155 has a 1-signal at its output. Upon a trouble report from controller monitor 139, store 154 is cleared. AND gate 155 then carries a 0-signal at its output as indication of a fault in the idling information plane of inverter control device 138. The output signal of AND gate 155 addresses the corresponding indicator 160. AND gate 155 is not switched into conduction, however, if a fault signal comes simultaneously from inverter monitor 141. In that case, there is no disturbance in the idling electronic information circuit, but, instead, a disturbance is signalled in the leading electronic information circuit and leads to switch-over of the information planes.

When the trouble is corrected after a disturbance, a setting signal can be given to stores 151, 154 and 157 by means a manual switch 149, so that their outputs again carry 0-signals.

When only a disturbance of the voltage of the protected bus is indicated, it is concluded that there is a short circuit at the protected bus or in one of the connected loads. In that case, no switching of any kind occurs. If a disturbance in the output voltage of the inverter and a disturbance in the voltage at the protected bus are indicated, it is concluded that there is a defect in inverter control device 138. Then, control of the inverter is switched from the leading electronic information circuit to the idling, parallel, electronic information circuit by operation of double-throw switching device 137. If, after control of the inverter is switched over, trouble signals continue to come from the bus voltage monitor and the inverter monitor, it is concluded that there is a disturbance in the power section of the inverter. Then, supply of the protected bus is switched over from the inventor to direct feed from the supply network by activating switches 142 and 146.

If only controller monitor 139 indicates a trouble signal but no trouble signal comes simultaneously from inverter monitor 141, it is concluded that there is a disturbance in the idling information plane of inverter controller 138. This disturbance is merely indicated.

The invention can also be used in protected power supplies which are fed, in undisturbed normal operation, directly from the supply network and which are switched over to supply from a converter if the network line voltage is disturbed. The converter can operate in standby at no load, the valves of the power electronics being addressed by firing pulses from control electronics of redundant design. It is also possible to use a converter in which the control electronics is operating in standby condition, but the passage of firing pulses to the valves is blocked. The firing pulses are released only upon a starting command and the electronic power circuits are started. In this case, in particular, two electronic models of the electronic power circuitry can be used, since the control loops of the two control devices are not closed via the shutdown electronic power circuits. The two control devices and the two models are kept tracking each other. It is furthermore advantageous to include the necessary fast-starting devices in the information-processing electronics and to provide them in duplicate.

In the practical realization of the invention, the correct interface between the information processing electronics and the power electronics is of importance. This interface can be placed, for instance, immediately after the controllers, with the firing pulse amplifiers and transformers being considered as part of the power electronics. However, the interface can also be placed so that the firing pulse amplifiers are considered as part of the information-processing electronics and the firing pulse transformers as part of the power electronics. Decisive for choice of correct interface is the defect probability of the components in question. The components with very low defect probability are counted as part of the power electronics and provided only once, while the components with relatively higher defect probability are counted as part of the information-processing electronics, being provided at least in duplicate and operated in parallel.

Important, also, is the protected setting of the reference values, since errors in setting the reference values are not detected by the monitoring devices. For protected setting of reference values, the setting devices such as potentiometers or control devices, can be provided in triplicate and their signals can be conducted via a selection circuit.

What is claimed is:

1. A power converter, secure against breakdown, having an electronic power circuit in which the controlled valves are addressed by electronic information processing circuits, comprising:
   (a) a single electronic power circuit;
   (b) redundant information processing circuits having at least two parallel control units, of which one controls the power circuits as leading control and another operates in standby condition; and
   (c) a monitoring device coupled to the control units which, in the event of a disturbance in the leading control unit, switches control of the power circuit to a standby unit.

2. A converter in accordance with claim 1 in which a simulator is provided for simulating the electronic power circuit and in which the leading control unit supplies firing pulses to the controlled valves of the power circuit while the firing pulses from the standby control unit, operating in parallel, are supplied to the simulator, and the monitoring device compares operation of the leading control unit with measured actual values of the electronic power circuit and monitors operation of the standby control unit with respect to artificial actual values from the simulator and reports trouble and, in the event of a disturbance, switches control of the electronic power circuit to the undisturbed control unit.

3. A converter in accordance with claim 1 further comprising:
   servo control loops in each control unit, the loops in the standby control unit following the loops in the leading control unit;
   means for comparing measured power circuit operating values with predetermined reference values;
   means for comparing pulse patterns of firing pulses generated for the controlled valves by the leading and the standby control units and generating a trouble signal when the patterns are in disagreement; and
   a monitoring device, responsive to the trouble signal, for switching control of the electronic power circuitry from the leading control unit to the standby control unit when the compared values differ from each other by an impermissible amount, and for signalling a disturbance in the standby control unit when there is a trouble signal and the compared values do not significantly differ from each other.

* * * * *